US010971874B2

(12) United States Patent
Doi et al.

(10) Patent No.: US 10,971,874 B2
(45) Date of Patent: Apr. 6, 2021

(54) LOCK MECHANISM AND BUS BAR MODULE

(71) Applicants: Yazaki Corporation, Tokyo (JP); TOYOTA JIDOSHA KABUSHIKI KAISHA, Toyota (JP)

(72) Inventors: Masamichi Doi, Kakegawa (JP); Ryosuke Murata, Fujieda (JP); Kouichi Nagamine, Toyota (JP)

(73) Assignees: YAZAKI CORPORATION, Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/669,936

(22) Filed: Oct. 31, 2019

(65) Prior Publication Data
US 2020/0153186 A1 May 14, 2020

(30) Foreign Application Priority Data

Nov. 9, 2018 (JP) .............................. JP2018-211225

(51) Int. Cl.
H01R 25/16 (2006.01)
E05B 65/00 (2006.01)

(52) U.S. Cl.
CPC ......... H01R 25/161 (2013.01); E05B 65/006 (2013.01)

(58) Field of Classification Search
CPC .. H01R 13/506; H01R 13/447; H01R 13/502; H01R 2201/26; H01R 25/161; H01R 9/223; H01R 4/5066; H01R 13/453; H01R 13/4538; H01R 13/52; H01R 13/5213; H01R 13/533; H02G 3/081; H02G 3/0418; H02G 3/088; H02G 3/14; H02G 5/04

See application file for complete search history.

(56) References Cited

U.S. PATENT DOCUMENTS 8,492,024 B2 * 7/2013 Ogasawara ........... H01M 2/206
429/121
8,580,423 B2 * 11/2013 Kim .................... H01M 2/1061
429/121
9,431,811 B2 * 8/2016 Takishita ............. H01R 13/447
9,583,928 B2 * 2/2017 Kawamura ............. H02G 3/18
(Continued)

FOREIGN PATENT DOCUMENTS

CN 207542307 U 6/2018
JP 55-71456 U 11/1978
(Continued)

Primary Examiner — Edwin A. Leon
Assistant Examiner — Matthew T Dzierzynski
(74) Attorney, Agent, or Firm — Sughrue Mion, PLLC

(57) ABSTRACT

A lock mechanism includes: a lock portion that protrudes from a ceiling wall (wall portion) of a cover and has a locking claw provided on a tip side; a lock receiving portion provided in a case and formed with a locking hole; and a flexible deformation portion which is a portion of a predetermined range in the vicinity of the lock portion on the ceiling wall (wall portion) of the cover and has flexibility higher than a portion outside the predetermined range, and is bent such that the lock portion is tilted so that the locking claw gets over an edge of the locking hole when the locking claw is locked to the locking hole, and after the locking, biases the lock portion in a pulling direction that pulls the locking claw together with the locking hole by a restoring force of bending.

7 Claims, 6 Drawing Sheets

(56) References Cited

U.S. PATENT DOCUMENTS

| | | | |
|---|---|---|---|
| 9,601,742 B2* | 3/2017 | Furuya | H01M 2/1077 |
| 9,758,115 B2* | 9/2017 | Maebashi | B60R 16/0238 |
| 9,941,086 B2* | 4/2018 | Onoda | H01H 85/205 |
| 9,954,310 B2* | 4/2018 | Ogasawara | H01H 85/2045 |
| 10,249,865 B2* | 4/2019 | Ogasawara | H01M 2/206 |
| 10,249,966 B2* | 4/2019 | Yaita | H01R 11/288 |
| 2002/0157847 A1* | 10/2002 | Chiriku | B60R 16/0238 174/50 |
| 2012/0067610 A1* | 3/2012 | Stonebraker | H02G 3/081 174/50 |
| 2014/0311768 A1 | 10/2014 | Takishita et al. | |

FOREIGN PATENT DOCUMENTS

| | | |
|---|---|---|
| JP | 2005-354767 A | 12/2005 |
| JP | 2013-178969 A | 9/2013 |

* cited by examiner

LOCK MECHANISM AND BUS BAR MODULE

TECHNICAL FIELD

The present invention relates to a lock mechanism for fixing a cover to a case, and a bus bar module to which such a lock mechanism is applied.

BACKGROUND ART

Conventionally, a bus bar module is known in which an opening of a case containing a bus bar is covered with a cover (see, for example, Patent Literature 1). In the bus bar module described in Patent Literature 1, a lock mechanism is applied that locks a locking claw of a lock portion provided on one member into a lock hole of a lock receiving portion provided on the other member for fixing the cover to the case. By applying such a lock mechanism, the number of parts of the bus bar module can be reduced and the manufacturing cost can be reduced, for example, as compared with the case where the cover is screwed to the case.

PRIOR ART DOCUMENT

Patent Literature

Patent Literature 1: JP 2005-354767 A

SUMMARY OF INVENTION

Technical Problem

However, in the above-described lock mechanism, depending on the sizes and shapes of the case and the cover, since the force required for sufficient locking of the locking claw to the locking hole becomes too large, the cover may be closed in a half-fitted state where locking is insufficient. Such a half-fitted state is not desirable because the cover is easily removed from the case.

Up to this point, the situation of the occurrence of half-fitting in the lock mechanism has been described by taking the bus bar module as an example. However, such a situation can generally occur as long as the locking mechanism locks the locking claw in the locking hole.

Accordingly, paying attention to the above situation, an object of the present invention is to provide a lock mechanism capable of suppressing the occurrence of half-fitting and a bus bar module to which such a lock mechanism is applied.

Solution to Problem

In order to solve the above problem, according to the present invention, there is provided a lock mechanism for fixing a cover covering an opening of a case formed on the case comprising:

a lock portion that protrudes from a wall portion that constitutes one of the case and the cover and that has a locking claw provided on a tip side thereof;

a lock receiving portion provided on another of the case and the cover and having a locking hole for locking the locking claw of the lock portion; and a flexible deformation portion which is a portion of a predetermined range in the vicinity of the lock portion on the wall portion and has flexibility higher than a portion outside the predetermined range, and is bent such that the lock portion is tilted so that the locking claw gets over an edge of the locking hole when the locking claw is locked to the locking hole, and after the locking, biases the lock portion in a pulling direction that pulls the locking claw together with the locking hole by a restoring force of bending.

Effect of the Invention

According to the locking mechanism and the bus bar module of the present invention, when the locking claw of the lock portion is locked in the locking hole of the lock receiving portion, the flexible deformation portion provided in the vicinity of the lock portion is bent by an operator. As a result, the lock portion is tilted, and the locking claw gets over the edge of the locking hole and locks. At this time, since the flexibility of the flexible deformation portion is higher than that of other portions, the operator can bend the flexible deformation portion to tilt the lock portion without requiring a large force. In addition, after the locking, the locking claw is pulled by the bending restoring force in the flexible deformation portion, so that the locking force with respect to the locking hole is strengthened. Thereby, the occurrence of the half fitting of the lock mechanism is suppressed, and the cover can be made difficult to come off from the case.

DESCRIPTION OF EMBODIMENTS

Hereinafter, an embodiment of the present invention will be described.

Figure 1:
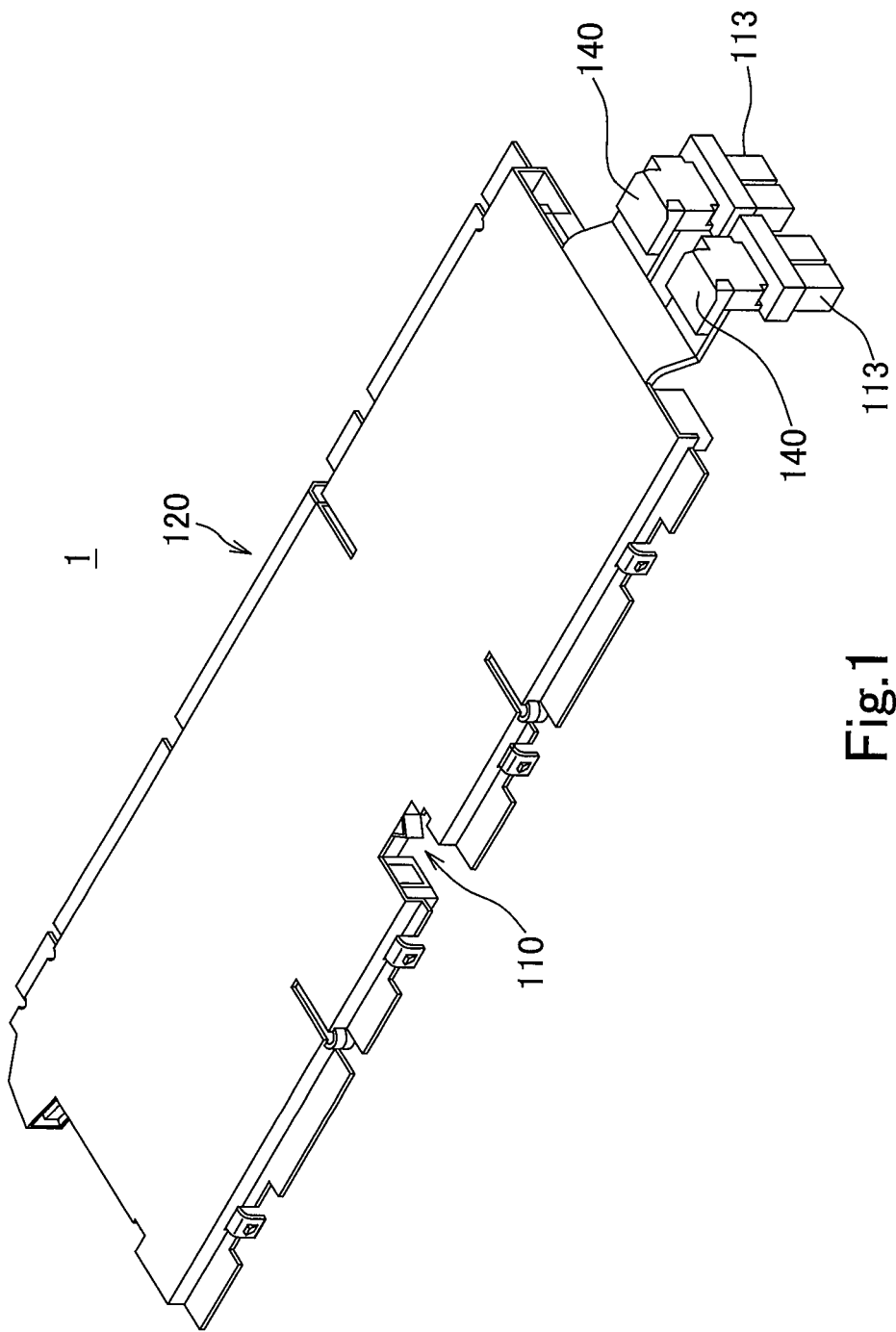
FIG. 1 is a perspective view showing a bus bar module according to an embodiment of the present invention.
Figure 2:
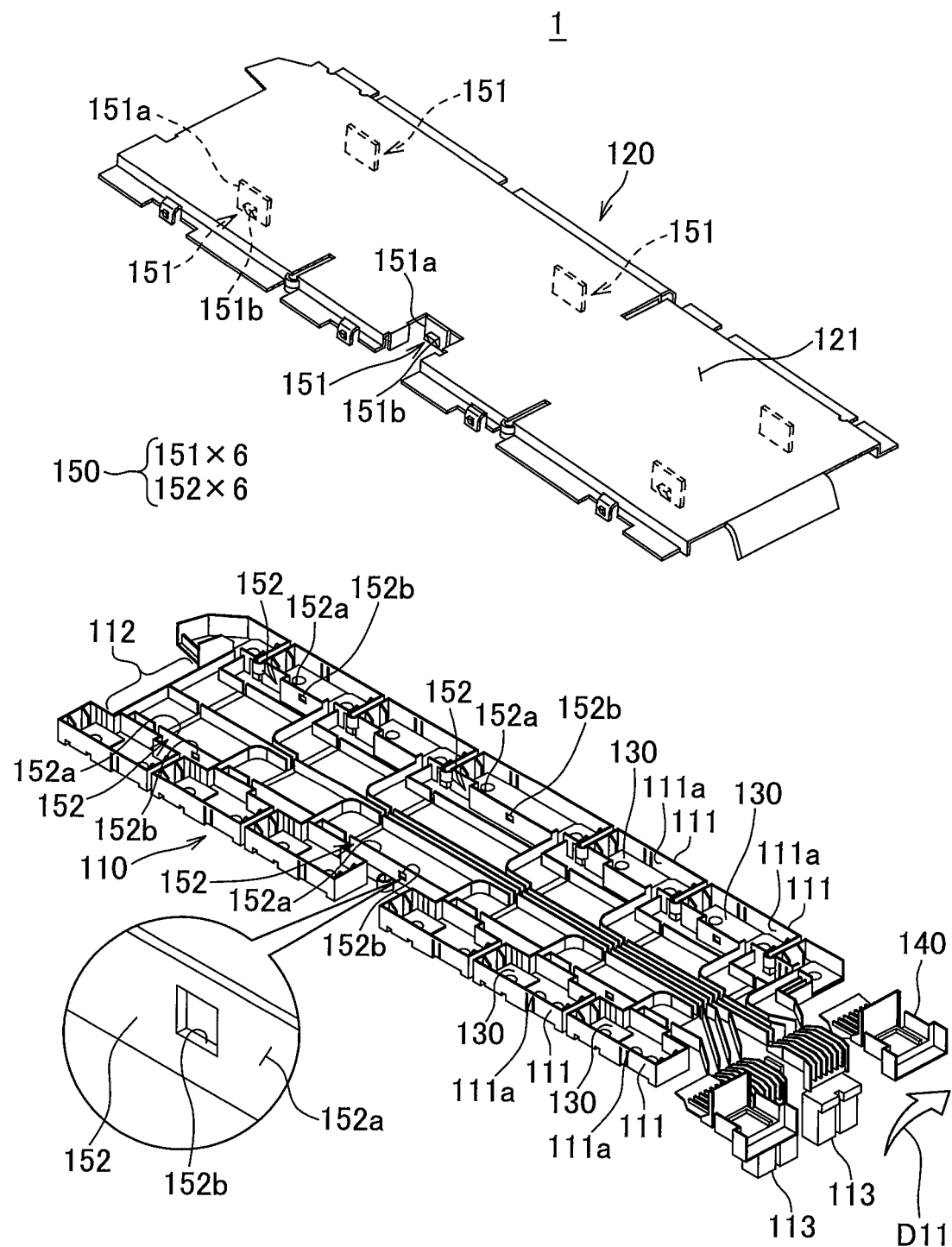
FIG. 2 is an exploded perspective view of the bus bar module shown in FIG. 1.

FIG. 1 is a perspective view showing a bus bar module according to an embodiment of the present invention. FIG. 2 is an exploded perspective view of the bus bar module shown in FIG. 1.

A bus bar module 1 of the present embodiment includes a case 110 and a cover 120 made of insulating resin, and a bus bar 130 made of conductive metal housed in the case 110.

The case 110 generally has a thin rectangular box shape, and a plurality of bus bar housing portions 111 each housing the bus bar 130 are arranged in two rows along each of a pair of opposed long sides. The bus bar 130 is housed in the opening 111a in each bus bar housing portion 111. The bus bar 130 in each bus bar housing portion 111 is connected to a pair of connector portions 113 provided at one end of the case 110 via a conducting portion 112 provided between the two rows of bus bar housing portions 111. The cover 120 has a substantially rectangular plate shape, and covers the openings 111a and the conductive portions 112 of the two rows of bus bar housing portions 111 as a whole. In addition, the bus bar module 1 of the present embodiment is also provided with a connector cover 140 made of an insulating resin that covers the pair of connector portions 113. Note that in the exploded perspective view of FIG. 2, the connector cover 140 is shown in a state in which only one of the pair of connector portions 113 is turned over in a direction of an arrow D11 and removed from the connector portion 113.

Here, in the present embodiment, a lock mechanism 150 described below is employed for fixing the cover 120 to the case 110. This lock mechanism 150 includes a lock portion 151 and a lock receiving portion 152. The lock portions 151 are provided at six places on the cover 120 which is one of the case 110 and the cover 120. The lock receiving portions 152 are provided on the case 110 which is the other of the case 110 and the cover 120 in one-to-one correspondence with the six lock portions 151.

First, the lock portion 151 is provided on a back surface of the ceiling wall 121, which is a wall portion that covers the opening 111a of the bus bar housing portion 111 together with the conduction portion 112 in the cover 120, facing a side of the case 110.

Figure 3:
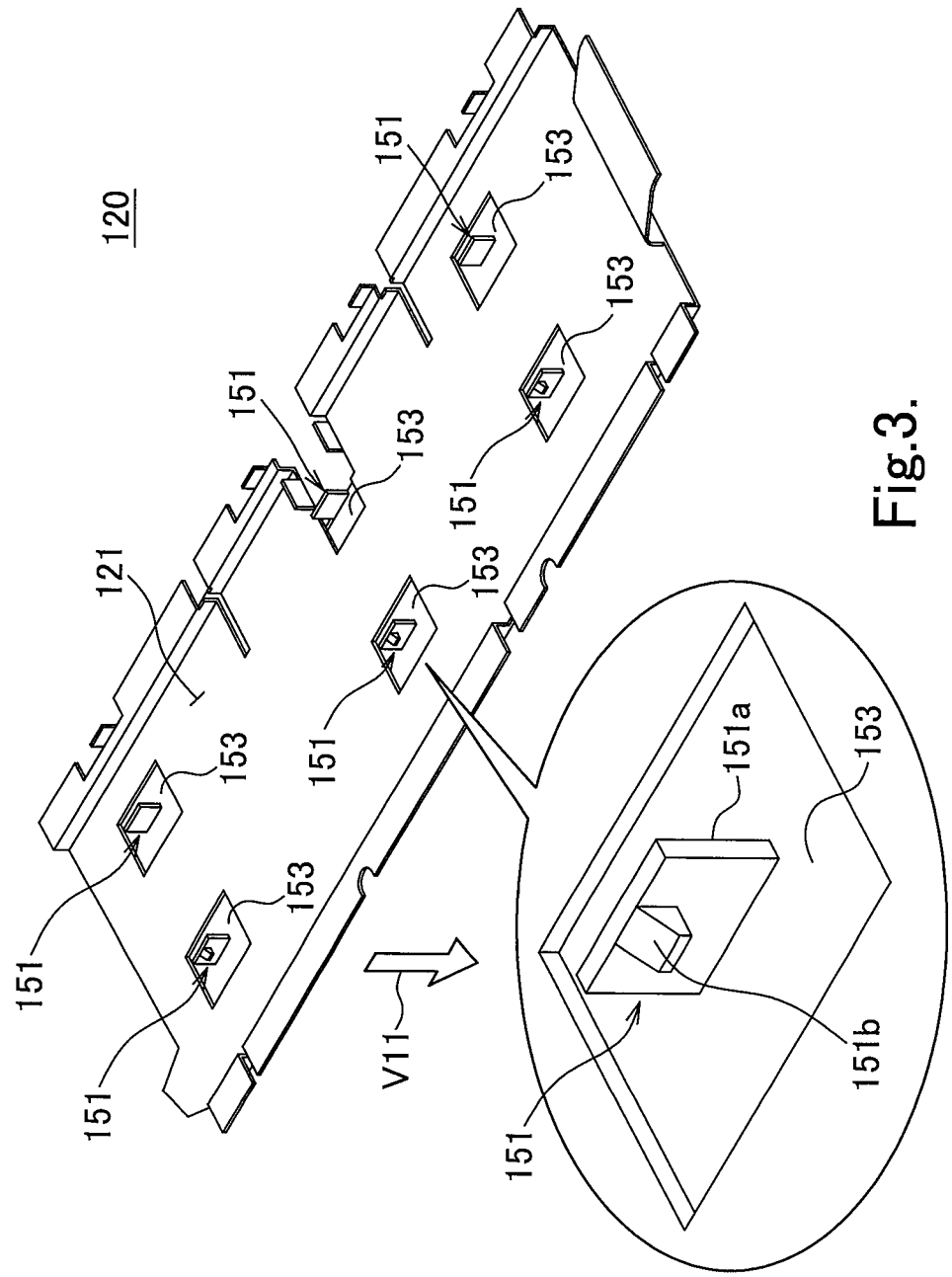
FIG. 3 is a perspective view showing the cover shown in FIG. 2 upside down so that a lock portion provided on a back surface of a ceiling wall can be seen.

FIG. 3 is a perspective view showing the cover shown in FIG. 2 upside down so that a lock portion provided on a back surface of a ceiling wall can be seen.

Each of the six lock portions 151 includes a rectangular plate-shaped arm portion 151a that protrudes from a back surface of the ceiling wall 121 in the cover 120, and a locking claw 151b provided on its tip end side. The locking claw 151b in each lock portion 151 is formed so as to protrude from the conducting portion 112 side toward the bus bar housing portion 111 side in the case 110 when the cover 120 is put on the case 110.

On the other hand, each of the six lock receiving portions 152 shown in FIG. 2 is associated with a locking hole 152b provided in a standing wall 152a erected at the boundary between the two rows of bus bar housing portions 111 and the conducting portion 112 between them. The standing wall 152a of each lock receiving portion 152 is provided so as to face the arm portion 151a of the lock portion 151 when the cover 120 is put on the case 110. At this time, the standing wall 152a of the lock receiving portion 152 is located on the bus bar housing portion 111 side, and the arm portion 151a of the lock portion 151 is located on the conducting portion 112 side.

When the cover 120 is put on the case 110, the six lock portions 151 are inserted into the conducting portion 112 side of the six lock receiving portions 152. Then, the locking claws 151b of the lock portions 151 are fitted and locked in the locking holes 152b of the lock receiving portions 152 so as to penetrate from the conducting portion 112 side to the bus bar housing portion 111 side. The cover 120 is fixed to the case 110 by the six lock portions 151 being locked with the six lock receiving portions 152.

Here, in the vicinity of the lock portion 151 on the ceiling wall 121 of the cover 120, a flexible deformation portion 153 which is a portion in a predetermined range and has a higher flexibility than a portion outside the predetermined range is provided. The term "flexibility" as used herein means that the operator can press the flexible deformation portion 153 and bend it so that the locking claw 151b can be tilted so that the locking claw 151b gets over the edge of the locking hole 152b. More specifically, the flexibility refers to the flexibility of bending in the out-of-plane direction of the ceiling wall 121. Of the six lock portions 151, the flexible deformation portions 153 of the five lock portions 151 provided at positions away from the edge of the ceiling wall 121 are flexibly deformed in a rectangular range surrounding each lock portion 151. In addition, with respect to one lock portion 151 provided at an edge of a notch formed in the ceiling wall 121, a rectangular range extending from the edge where the lock portion 151 is provided to the center side of the ceiling wall 121 is the flexible deformation portion 153.

Figure 4:
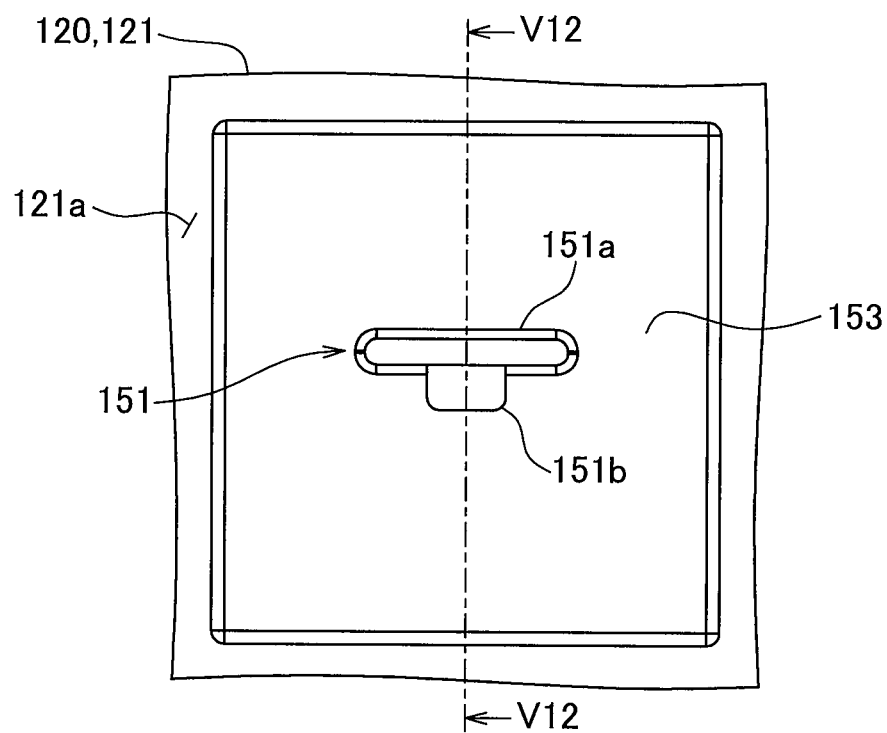
FIG. 4 is a plan view of the lock portion and a flexible deformation portion shown in FIG. 3 as seen from the direction V11 in FIG. 3.
Figure 5:
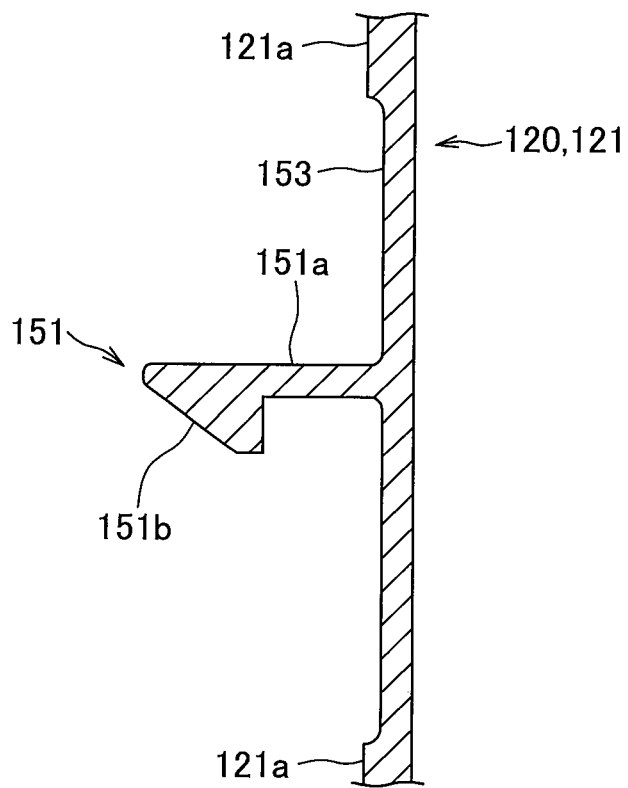
FIG. 5 is a cross-sectional view of the lock portion and the flexible deformation portion taken on line V12-V12 of FIG. 4.

FIG. 4 is a plan view of the lock portion and a flexible deformation portion shown in FIG. 3 as seen from the direction V11 in FIG. 3, and FIG. 5 is a cross-sectional view of the lock portion and the flexible deformation portion taken on line V12-V12 of FIG. 4.

In these FIG. 4 and FIG. 5, the lock portion 151 of one place provided in the position away from the edge of the ceiling wall 121 of the cover 120 among lock portions 151 of six places, and flexible deformation portion 153 provided around the lock portion 151 are shown as a representative example. The flexible deformation portion 153 shown here is a portion of a rectangular range where the lock portion 151 is located at the center. Further, this flexible deformation portion 153 is a thin portion in which a plate thickness is thinner than a portion 121a outside the rectangular range in the ceiling wall 121. Moreover, the thin portion as this flexible deformation portion 153 is formed in a shape where a portion of the rectangular range of the back surface which is the wall surface of the protrusion portion side of the lock portion 151 in the ceiling wall 121 dented in a plate thickness direction. The lock portion 151 in the present embodiment has the locking claw 151b formed on the distal end side of the arm portion 151a protruding from a bottom surface of the dented deformable flexible portion 153.

Figure 6:
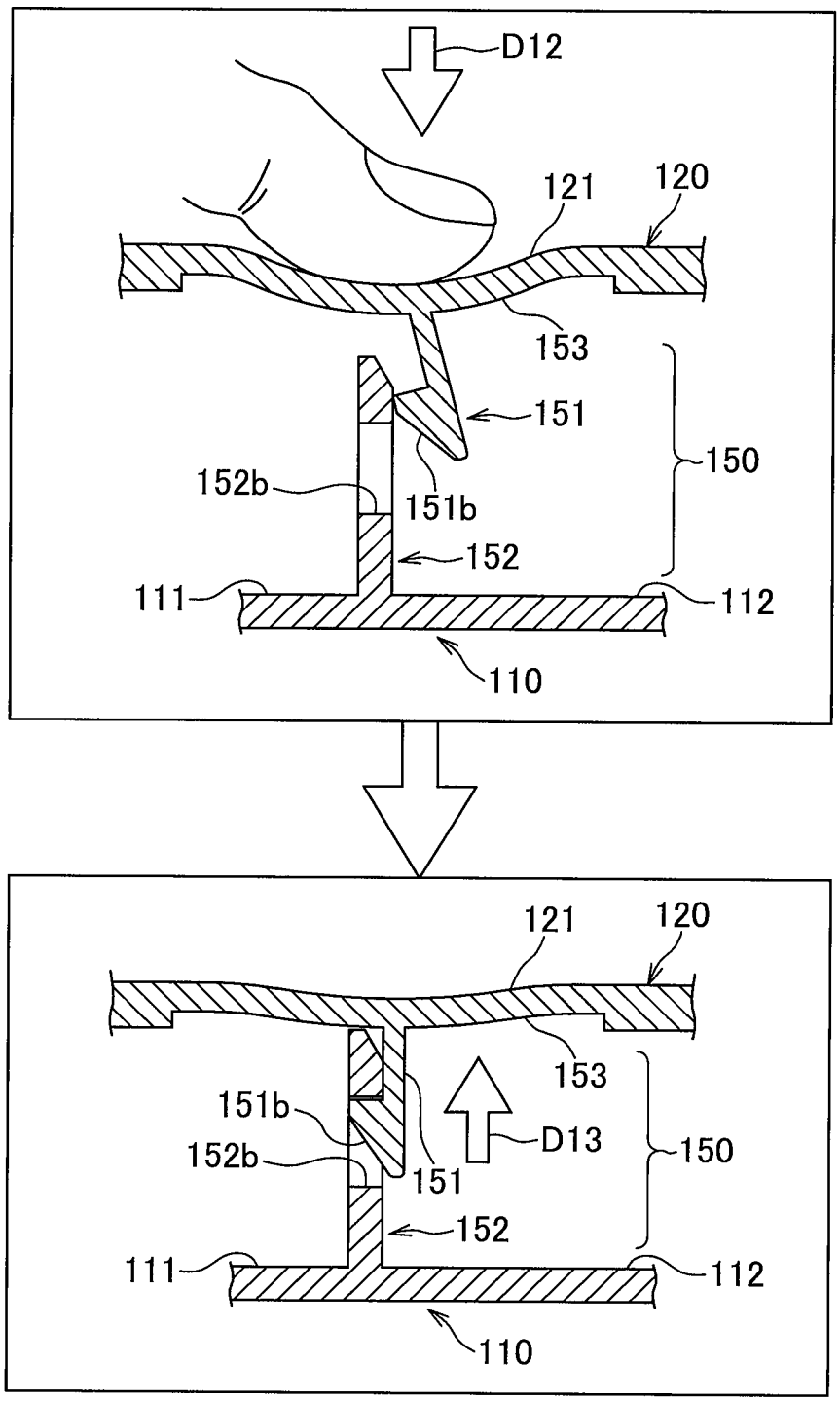
FIG. 6 is a schematic diagram showing how a locking claw of the lock portion is locked in a locking hole of the lock receiving portion when a cover is attached to a case in a lock mechanism shown in FIG. 2 to FIG. 5.

FIG. 6 is a schematic diagram showing how a locking claw of the lock portion is locked in a locking hole of the lock receiving portion when a cover is attached to a case in a lock mechanism shown in FIG. 2 to FIG. 5. In FIG. 6, the lock mechanism 150 is shown in a sectional view similar to FIG. 5.

When the cover 120 is attached to the case 110, as described above, the lock portion 151 constituting the lock mechanism 150 is inserted into the conducting portion 112 side of the lock receiving portion 152 in the case 110. Then, before the locking claw 151b of the lock portion 151 is locked in the locking hole 152b of the lock receiving portion 152, the operator presses the flexible deformation portion 153 from the front side of the cover 120 in the arrow D12 direction so that the flexible deformation portion 153 is bent toward the case 110. As a result, the lock portion 151 is tilted, and the tip side thereof is displaced in a direction in which the locking claw 151b gets over the edge of the locking hole 152b. When the tip of the lock portion 151 is displaced in this manner, the locking claw 151b gets over the edge of the locking hole 152b. When the locking claw 151b passes over the edge of the locking hole 152b and passes through the locking hole 152b from the conducting portion 112 side to the bus bar housing portion 111 side, the operator releases the pressing of the flexible deformation portion 153. Then, the flexure of the flexible deformation portion 153 is restored, but in the present embodiment, the flexible deformation portion 153 is restored in a state where a slight flexure is left. As a result, the lock portion 151 after being locked is biased in a pulling direction D13 that pulls the locking claw 151b together with the locking hole 152b by the restoring force of the remaining flexure. Locking through such a flexure of the flexible deformation portion 153 is performed between the six lock portions 151 and the six lock receiving portions 152 shown in FIG. 2 and the cover 120 is fixed to the case 110.

Figure 7:
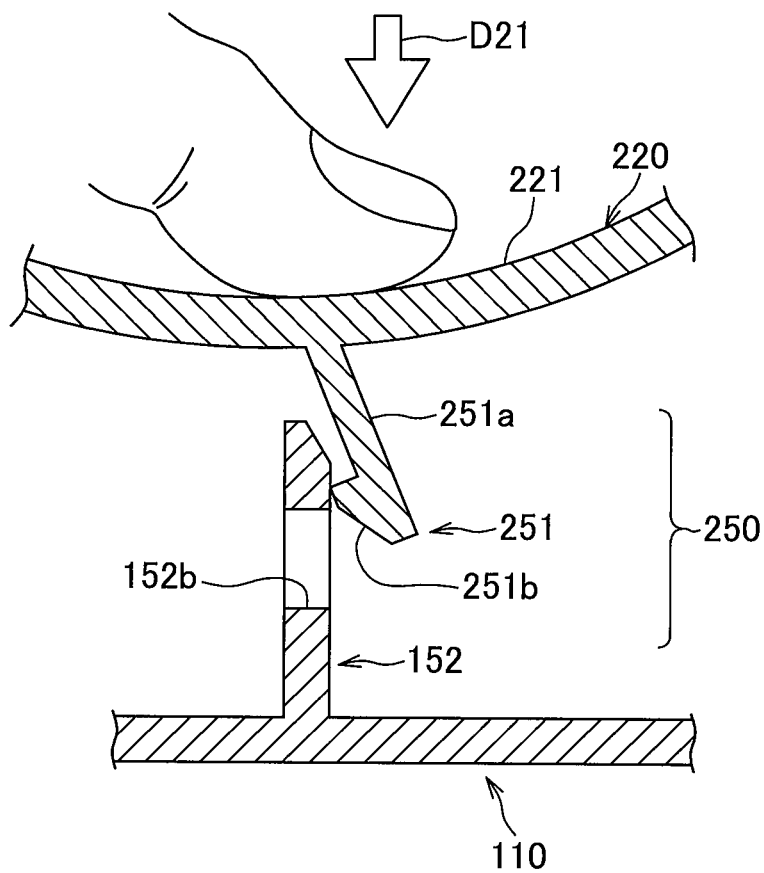
FIG. 7 is a view showing a comparative example for comparison with the lock mechanism shown in FIG. 6.

FIG. 7 is a view showing a comparative example for comparison with the lock mechanism shown in FIG. 6. Incidentally, in FIG. 7, the same components as those shown in FIG. 6 are denoted by the same reference numerals as those in FIG. 6, and the redundant description of these same components will be omitted below.

In the lock mechanism 250 of the comparative example shown in FIG. 7, the ceiling wall 221 of the cover 220 provided with the lock portion 251 is not provided with a portion corresponding to the flexible deformation portion 153 in the above-described embodiment. The lock portion 251 is provided with an arm portion 251a protruding from a ceiling wall 221 that is uniformly thick. For this reason, in the lock mechanism 250 of this comparative example, the displacement of the front end side of the lock portion 251 before the locking claw 251b is locked to the locking hole 152b of the lock receiving portion 152 is performed by the operator pressing the cover 220 in the direction of the arrow D21 to bend the thick ceiling wall 221 as a whole. After the locking claw 251b is locked in the locking hole 152b, the lock portion 251 is biased by such a state that the overall flexure remains slightly. However, in the lock mechanism 250 of this comparative example, there are a wide range of a portion that bend in order to allow the locking claw 251b to get over the edge of the locking hole 152b. In addition, it is difficult to bend the portion due to its thickness compared to the above-described flexible deformation portion 153. In the lock mechanism 250 of the comparative example, the locking claw 251 gets over the edge of the locking hole 152b and locks it while bending the difficult-to-bend portion. Accordingly, the force that the operator must apply to the cover 220 until the locking claw 251 is sufficiently locked in the locking hole 152b tends to increase. As a result, the cover 220 may be closed in a half-fitted state where the locking claw 251b is not sufficiently locked with the locking hole 152b. Such a half-fitted state is not desirable because the cover 220 is easily detached from the case 110.

Compared with the lock mechanism 250 of this comparative example, according to the lock mechanism 150 shown in FIGS. 2 to 6 and the bus bar module 1 shown in FIGS. 1 and 2 employing the lock mechanism 150, the following effects can be obtained.

According to the present embodiment, when the locking claw 151b of the lock portion 151 is locked to the locking hole 152b of the lock receiving portion 152, the flexible deformation portion 153 is bent by the operator. Thereby, the lock portion 151 is tilted and the locking claw 151b gets over the edge of the locking hole 152b and locked. At this time, since the flexibility of the flexible deformation portion 153 is higher than that of the other portions, the operator can cause the flexible deformation portion 153 to generate a flexure to tilt the lock portion 151 without requiring a large force. In addition, after the locking, the locking claw 151b is pulled by the restoring force of the flexure of the flexible deformation portion 153, whereby the locking force with respect to the locking hole 152b is strengthened. Thereby, the occurrence of the half-fitting state of the lock mechanism 150 is suppressed, and it is possible to make it difficult for the cover 120 to be easily detached from the case 110.

Here, in the present embodiment, the flexible deformation portion 153 is a thin-wall portion that is thinner than the portion 121a outside the rectangular range in the ceiling wall 121.

Unlike the present embodiment, the flexible deformable portion may be made of a different material having a different flexibility from the portion 121a outside the rectangular range of the ceiling wall 121. According to the present embodiment, the flexible deformation portion 153 can be easily obtained by using the thin portion as compared with the method of changing the material in this way. Moreover, the effect with respect to a modification demonstrated below can also be acquired by making the flexible deformation portion 153 into a thin portion.

Figure 8:
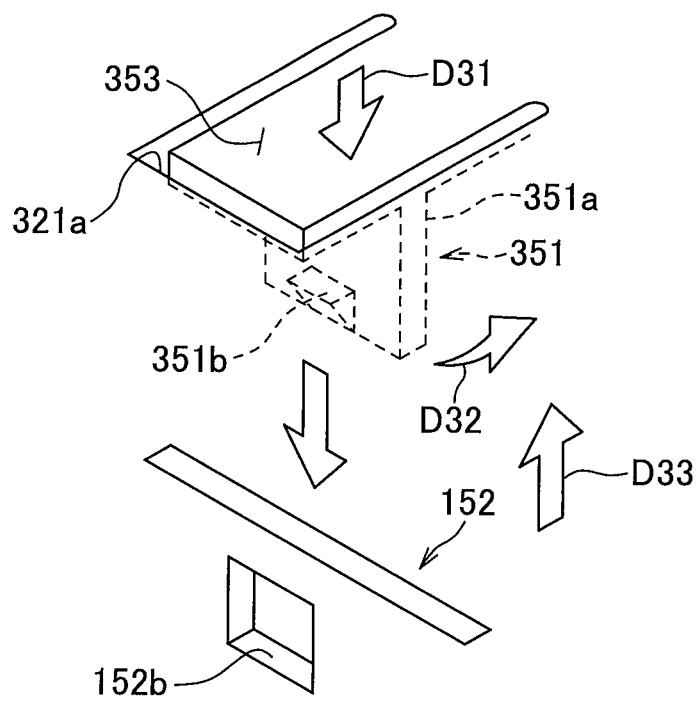
FIG. 8 is a view showing a modification of the flexible deformation portion shown in FIGS. 3 to 6.

FIG. 8 is a view showing a modification of the flexible deformation portion shown in FIGS. 3 to 6.

The flexible deformable portion 353 of the modification shown in FIG. 8 is a cantilever-shaped portion partitioned by a substantially C-shaped slit 321a, and a lock portion 351 is provided at the middle portion in the longitudinal direction thereof. In this modification, when the locking claw 351b of the lock portion 351 is locked in the locking hole 152b of the lock receiving portion 152, the cantilever-shaped flexible deformation portion 353 is pushed down and bent in the direction of arrow D31 by the operator. As a result, the lock portion 351 is tilted in the direction of arrow D32, and the locking claw 351b gets over the edge of the locking hole 152b and locked. After the locking, the locking claw 351b is pulled in the pulling direction D33 by the restoring force of the slightly remaining flexure in the flexible deformation portion 353. In this modification also, the cantilever-like flexible deformation portion 353 is more easily bent than the other portions, so that the flexure for causing the locking claw 351b to get over the edge of the locking hole 152b can be generated without requiring such a large force. However, in this modification, since the flexible deformation portion 353 is formed by the slit 321a, there is a concern that foreign matter enters from the slit 321a.

In contrast to this modification, in the above-described embodiment, the flexible deformation portion 153 is formed of a thin portion, and there is no gap in the vicinity of the flexible deformation portion 153 that allows entry of foreign matter and it is possible to eliminate the concern that foreign matter enters or the like.

Further, in the present embodiment, the thin wall portion as the flexible deformation portion 153 is a portion formed in a shape in which the wall surface on the protrusion portion side of the lock portion 151 in the ceiling wall 121 of the cover 120 is dented in the plate thickness direction.

According to the present embodiment, the thin wall portion as the flexible deformation portion 153 is formed in a recessed shape on the wall surface on the protrusion portion side of the lock portion 151, which is the side that pulls the lock portion 151 after locking. That is, on the wall surface on the side that pulls the lock portion 151, the flexible deformation portion 153 that is bent to generate the traction force and the other portion are formed so as to be discontinuous by a step. This is preferable because it is possible to suppress a situation in which the flexure after locking in the flexible deformation portion 153 further spreads to the peripheral portion.

Further, in the present embodiment, the lock portion 151 is provided on the cover 120, and the lock receiving portion 152 is provided on the case 110.

According to the present embodiment, as shown in FIG. 2, the lock portion 151 is provided on the cover 120 having a simple shape compared to the case 110 such as a flat plate shape. For this reason, it is also preferable to provide the flexible deformation portion 153 in the vicinity thereof because there are fewer obstacles and easier than providing the case 110 with the flexible deformation portion.

Note that the embodiments and modifications described above are merely representative forms of the present invention, and the present invention is not limited to these embodiments. That is, various modifications can be made without departing from the scope of the present invention. Such modifications are included in the scope of the present invention as long as they have the configuration of the lock mechanism and the bus bar module of the present invention.

For example, in the above-described embodiments and modifications, the lock mechanism 150 applied to fixing the cover 120 to the case 110 of the bus bar module 1 is illustrated as an example of the lock mechanism according to the present invention. However, the locking mechanism according to the present invention is not limited to this, and any specific application mode may be used as long as it is a locking mechanism for fixing a cover that covers an opening of a case.

In the above-described embodiments and modifications, as an example of the locking mechanism according to the present invention, the locking mechanism 150 in which the cover 120 is provided with the lock portion 151 and the case 110 is provided with the lock receiving portion 152 is illustrated. However, the lock mechanism referred to in the present invention is not limited to this, and the cover may be provided with a lock receiving portion and the case may be provided with a lock portion. However, by using a lock mechanism in which a lock portion is provided on the cover and a lock receiving portion is provided on the case, the lock portion and its surrounding flexible deformation portion can be easily provided on a member with few obstacles as described above.

REFERENCE SIGNS LIST 1 bus bar module
110 case
111 bus bar housing portion
111a opening
112 conducting portion
113 connector portion
120 cover
121 ceiling wall (wall portion)
130 bus bar
140 connector cover
150 lock mechanism
151, 351 lock portion
151a arm portion
151b, 351b locking claw
152 lock receiving portion
152a standing wall
152b locking hole
153, 353 flexible deformation portion

The invention claimed is:

1. A lock mechanism for fixing a cover covering an opening of a case formed on the case comprising:
   a lock portion that protrudes from a position away from an edge of a wall portion that constitutes one of the case and the cover and that has a locking claw provided on a tip side thereof;
   a lock receiving portion provided on another of the case and the cover and having a locking hole for locking the locking claw of the lock portion; and
   a flexible deformation portion which is a portion of the wall portion having a predetermined range in the vicinity of the lock portion on the wall portion and has flexibility higher than a portion of the wall portion outside the predetermined range, and is bent such that the lock portion is tilted so that the locking claw gets over an edge of the locking hole when the locking claw is locked to the locking hole, and after the locking, biases the lock portion in a pulling direction that pulls the locking claw together with the locking hole by a restoring force of bending.

2. The lock mechanism as claimed in claim 1, wherein the flexible deformation portion is a thin-walled portion that is thinner than the portion outside the predetermined range in the wall portion.

3. The lock mechanism as claimed in claim 2, wherein the thin-walled portion is a portion formed in a shape in which a wall surface on a protruding side of the lock portion on the wall portion is recessed in a thickness direction.

4. The lock mechanism as claimed in claim 3, wherein the lock portion is provided on the cover, and wherein the lock receiving portion is provided on the case.

5. The lock mechanism as claimed in claim 2, wherein the lock portion is provided on the cover, and wherein the lock receiving portion is provided on the case.

6. The lock mechanism as claimed in claim 1, wherein the lock portion is provided on the cover, and wherein the lock receiving portion is provided on the case.

7. A bus bar module comprising:
   a case having an opening;
   a bus bar housed in the opening of the case;
   a cover covering the opening; and
   the lock mechanism as claimed in claim 1 for fixing the cover to the case.

* * * * *